US006532849B1

(12) United States Patent
Yamazaki et al.

(10) Patent No.: US 6,532,849 B1
(45) Date of Patent: Mar. 18, 2003

(54) COMPLEX TOOL

(75) Inventors: Tsunehiko Yamazaki, Nagoya (JP); Naoe Fukumura, Nagoya (JP); Masayoshi Mizukado, Kani (JP); Kazuhiro Kikata, Gifu (JP); Sadami Miyazaki, Konan (JP); Koichi Maki, Nagoya (JP)

(73) Assignee: Yamazaki Mazak Kabushiki Kaisha (JP)

( * ) Notice: Subject to any disclaimer, the term of this patent is extended or adjusted under 35 U.S.C. 154(b) by 50 days.

(21) Appl. No.: 09/651,954

(22) Filed: Aug. 31, 2000

(30) Foreign Application Priority Data

Jun. 29, 2000 (JP) ....................................... 2000-196146

(51) Int. Cl.[7] .......................... B23B 29/24; B23B 41/00

(52) U.S. Cl. ............................ 82/158; 82/159; 82/120; 82/161; 407/55

(58) Field of Search .......................... 82/152, 120, 121, 82/158, 159, 161; 407/55, 54, 32; 408/83, 225, 226

(56) References Cited

U.S. PATENT DOCUMENTS

| | | | | |
|---|---|---|---|---|
| 2,207,067 A | * | 7/1940 | Patscheider | 408/26 |
| 3,910,097 A | * | 10/1975 | Kubalek | 72/313 |
| 4,129,401 A | * | 12/1978 | Berthier | 408/59 |
| 5,425,604 A | * | 6/1995 | Scheer et al. | 408/83 |
| 5,458,444 A | * | 10/1995 | Duncan | 408/80 |

* cited by examiner

*Primary Examiner*—Henry Tsai
(74) *Attorney, Agent, or Firm*—Wolf, Block, Schorr and Solis-Cohen LLP; Richard P. Gilly

(57) ABSTRACT

A complex tool has a main body and a turning tool provided at an outer periphery portion of the main body. The turning tool is capable of machining on a rotating workpiece without rotating itself. An insert installed on the turning tool has a top end which contacts a workpiece by projecting a predetermined amount outside the main body's outer peripheral face. It also projects a predetermined amount from a top end portion of the main body in a direction of an axial center of the tool. The complex tool also has a rotating tool for machining by rotating itself. The rotating tool accomplishes machining corresponding to an axial center of the main body.

2 Claims, 1 Drawing Sheet

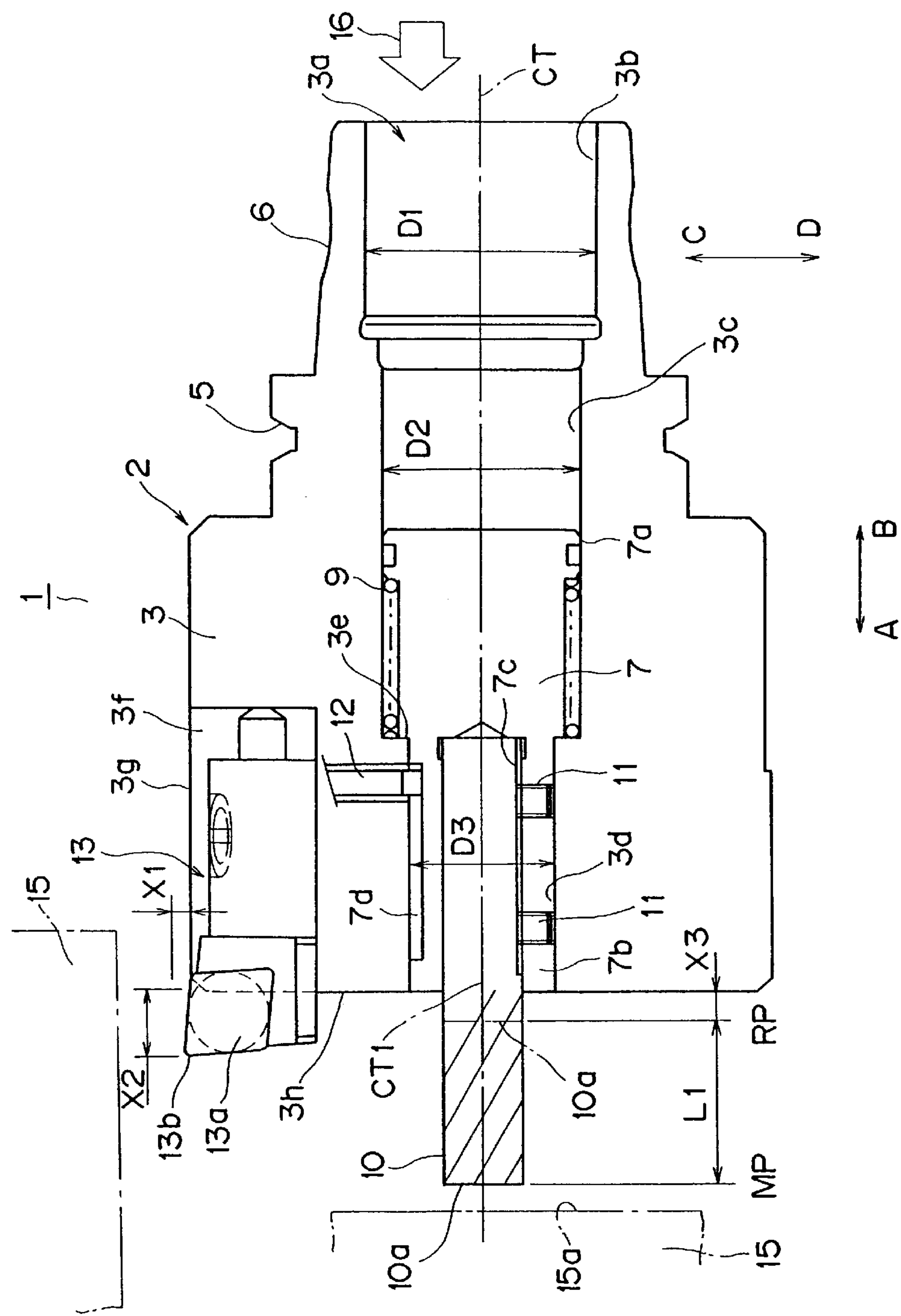
F I G. 1
1
2
3
3a
3b
3c
3d
3e
3f
3g
3h
5
6
7
7a
7b
7c
7d
9
10
10a
11
12
13
13a
13b
15
15a
16
CT
CT1
D1
D2
D3
X1
X2
X3
L1
RP
MP
A
B
C
D

COMPLEX TOOL

BACKGROUND OF THE INVENTION

This invention relates to a complex tool capable of both machining, turning machining where a tool is fixed and held at the time of machining and drilling (tapping), milling and end mill machining where a tool is rotated at the time of machining.

A known conventional complex tool is one installing a plurality of inserts at the top end of a tool itself in the shape of a bar. Using such a complex tool, milling machining is performed on the workpiece surface in a fixed state by the insert of the top end by rotating the complex tool according to machining contents, and turning machining is performed by the insert of the top end by rotating a workpiece in such a state that the complex tool is fixed and held.

In recent years, the machining to be performed with a machine tool, such as turning machining, trends to become complex and advanced. The development of the tool capable of both machining, turning and drilling (tapping) (the only "drill" in the present specification includes "tap") with one tool is expected in addition to the complex tool above-mentioned.

The object of the present invention is to provide a complex tool capable of performing both machining, turning machining and rotating machining by a drill (a tap), a milling cutter and an end mill with one tool, taking the above-mentioned circumstances into consideration.

SUMMARY OF THE INVENTION

The invention of claim 1 is a complex tool to be used by attachably and detachably installing on a tool holding means, comprising:

a main body;

a tool means for turning provided at an outer periphery portion of said main body; and a projected rotating tool means provided so as to correspond an axial center of said projected rotating tool means with an axial center of said main body; said complex tool having further character:

selectively performing turning machining with said tool means for turning or rotating machining for machining on a workpiece by rotating said projected rotating tool means.

According to the invention of claim 1, both machinings, turning machining and rotating machining with a drill (a tap) are possible with one tool by the tool means for turning and the projected rotating tool means, so the present invention can be applied to recent advanced machining and its machining efficiency can be increased.

The invention of claim 2 is the complex tool wherein said projected rotating tool means is fixedly provided in the axial center direction of said main body with respect to said main body.

According to the invention of claim 2, the complex tool can be comprised with simple structure.

The invention of claim 3 is the complex tool wherein said projected rotating tool means is provided so as to move in the axial center direction of said main body with respect to said main body.

According to the invention of claim 3, the projected rotating tool means can be moved in the axial center direction. Then, the projected rotating tool means can be retracted to the position where it does not obstruct the machining at the time of machining with the tool means for turning, and turning machining can be smoothly performed.

The invention of claim 4 is the complex tool as set forth in the invention of claim 3 wherein a movement driving means of said projected rotating tool means is provided with the main body, and said movement driving means moves and drives said projected rotating tool means in the axial center direction by driving fluid supplied from said tool holding means side.

According to the invention of claim 4, the projected rotating tool means can be driven from the tool holding means side, then, the structure of the complex tool can be made simple.

The invention of claim 5 is the complex tool wherein said projected rotating tool means is a drill, a tap, a milling cutter or an end mill.

According to the invention of claim 5, various kinds of rotating tools can be used, then, various kinds of machining is possible.

BRIEF DESCRIPTION OF THE DRAWINGS

FIG. 1 is a view showing an example of a complex tool to which the present invention is applied.

DESCRIPTION OF THE PREFERRED EMBODIMENT

A complex tool 1 has a tool holder 2, as shown in FIG. 1. The tool holder 2 has a main body 3 cylindrically formed as a whole. On the right hand of the figure of the main body 3, a tool holding slot 5 for exchanging an automatic tool is formed in the shape of a ring. On the right hand of the figure of the tool holding slot 5, a shank 6 is formed in the shape of a taper.

A hole 3*a* is provided with the main body 3 so as to penetrate in the direction of axial center CT of the main body 3. The hole 3*a* is comprised of an operating oil supply portion 3*b* on the right hand of the figure, which diameter is D1, a tool holding body storing cylinder 3*c* coaxially formed on the left hand of the operating oil supply portion 3*b*, which diameter is D2 smaller than D1, and a guide portion 3*d* coaxially formed on the left hand of the tool holding body storing cylinder 3*c*, which diameter is D3 further smaller than D2.

A slidable holder 7 is inserted into the tool holding body storing cylinder 3*c*, being free to slide in the direction of the axial center CT of the complex tool 1, that is, in the direction as shown by the arrows A and B. On the right edge portion of the figure of the slidable holder 7, a slidable contacting portion 7*a* in the shape of a circular ring is formed being free to slide in the direction as shown by the arrows A and B on the wall face of the tool holding body storing cylinder 3*c*. Between the slidable contacting portion 7*a* of the slidable holder 7 and a side wall 3*e* of the tool holding body storing cylinder 3*c*, a coiled spring 9 is provided so as to shrink, covering the periphery of the slidable holder 7. The slidable holder 7 is always energized by the coiled spring 9 in the direction as shown by the arrow B.

On the top end portion of the slidable holder 7, a tool installation portion 7*b* inserted into the guide portion 3*d* is formed. A tool storing hole 7*c* is provided with the tool installation portion 7*b* in the axial center CT direction of the complex tool 1. The top end of the tool storing hole 7*c* is open for the top end portion of the slidable holder 7, that is, for the top end portion of the tool holder 2. A projected rotating tool 10, which is a tool for machining a workpiece by rotating itself, such as a drill (including a tap, as mentioned before) a milling cutter and an end mill, is attachably and detachably installed on the tool storing hole 7*c* through fixed screws 11, 11. The axial center CT1 of the projected rotating tool 10 corresponds with the axial center CT of the main body 3 of the tool holder 2, that is, the rotational center of the tool holder 2.

On the outer peripheral portion of the tool installation portion 7*b*, a key seat 7*d* is formed in the direction as shown by the arrows A and B. A key 12 engaged with the main body 3 is provided with the key seat 7*d* such that its top end portion is inserted and engaged.

Besides, a cutting tool storing slot 3*f* is formed on the outer peripheral portion of the main body 3 so as to penetrate. On the cutting tool storing slot 3*f*, a cutting tool 13, which is a known turning tool, is attachably and detachably installed by an attaching bolt (not shown). An insert 13*a* is installed on the top end portion of the cutting tool 13 such that a top end 13*b* of the insert 13*a* is projected outside predetermined quantity X1 with respect to an outer peripheral face 3*g* of the main body 3 (upper hand in the figure). Furthermore, the top end 13*b* of the insert 13*a* is installed so as to project predetermined quantity X2 on the left hand in the figure with respect to a top end portion 3*h* of the left hand of the figure of the main body 3.

The complex tool 1 has the above-mentioned structure. Then, in order to perform turning machining with the complex tool 1, the complex tool 1 is installed on the tool holding means, such as a tool rest of a machine tool (not shown) through the shank 6. The tool holding means can fix and hold the complex tool 1 at a predetermined angle position around the axial center CT, as well as can rotate and drive the complex tool 1 around the axial center CT. Then, in order to perform the turning machining with the complex tool 1, the complex tool 1 is held and fixed at a predetermined angle position around the axial center CT such that the insert 13*a* of the cutting tool 13 of the complex tool 1 is faced to the cutting portion of a workpiece 15 on which turning machining is performed. In such a state, the machining is performed by moving and driving the cutting tool 13 of the complex tool 1 with respect to the workpiece 15 being in a rotating state in the direction as shown by the arrows A and B, and in the direction as shown by the arrows C and D so as to contact the top end 13*b* of the insert 13*a* with the workpiece 15.

On this occasion, the slidable holder 7, on which the projected rotating tool 10 is installed, is positioned at a retracted position, moved in the arrow B direction by the elasticity of the coiled spring 9, and a top end 10*a* of the projected rotating tool 10 is retracted at a retracted position RP, projecting predetermined quantity X3<X2 on the left hand in the figure rather than the top end portion 3*h* of the left hand of the figure of the main body 3. In this state, the top end 10*a* of the projected rotating tool 10 is positioned at the position retracted on the right hand in the figure rather than the top end 13*b* of the cutting tool 13 for turning. Then, the machining is smoothly executed by the cutting tool 13 without hindrance by the projected rotating tool 10 at the time of turning machining with the cutting tool 13.

Subsequently, in order to form a hole and a screw on an end face 15*a* of the workpiece 15 with the projected rotating tool 10, operating oil 16, such as coolant, is supplied from the operating oil supply portion 3*b* of the main body 3 through the tool rest on which the complex tool 1 is installed. Then, the slidable holder 7 is pressed and moved in the direction as shown by the arrow A against the elasticity of the coiled spring 9 by the operating oil 16 supplied operating oil supply portion 3*b*, and the projected rotating tool 10 installed on the slidable holder 7 is also moved and driven in the direction as shown by the arrow A, restricting the rotation by the key seat 7*d* and the key 12.

Then, the top end 10*a* of the projected rotating tool 10 is projected and moved predetermined quantity L1 in the direction as shown by the arrow A from the prior retracted position RP so as to position at a machining position MP. In this state, the top end 10*a* of the projected rotating tool 10 projects on the left hand in the figure rather than the top end 13*b* of the insert 13*a* of the cutting tool 13.

In this state, the tool holder 2 is rotated at a predetermined rotational number around the axial center CT by driving an appropriate driving unit of a tool rest, and the top end 10*a* of the projected rotating tool 10 is faced to the end face 15*a* of the workpiece 15. In this state, drilling/tapping machining (or milling machining) is performed on the end face 15*a* of the workpiece 15 with the projected rotating tool 10 being in a rotating state by moving the complex tool 1 in the direction as shown by the arrow A, that is, by relatively moving in the workpiece 15 direction.

On this occasion, the top end 10*a* of the projected rotating tool 10 projects on the left hand in the figure rather than the top end 13*b* of the insert 13*a* of the cutting tool 13, as explained hereinbefore. Then, the machining with the projected rotating tool 10 can be smoothly performed without hindrance by the cutting tool 13 at the time of machining on the workpiece 15 with the projected rotating tool 10.

The above-mentioned embodiment refers to the case where the projected rotating tool 10 is provided being free to project in the axial center CT direction with respect to the tool holder 2. The projected rotating tool 10 is not always provided being free to project, but may be fixedly provided with respect to the main body 3 of the tool holder 2.

Besides, the projected rotating tool 10 may be a tool, such as a milling cutter, in addition to drill/tap as long as it is installed, corresponding the axial center CT which is a rotational center of the tool holder 2 and its axial center CT1 with each other, and rotating machining for machining a workpiece is performed by rotating the tool itself together with the tool holder 2.

The present invention is explained on the basis of the embodiments heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. A complex tool adapted to be attachably and detachably installed on a machine tool by a tool holding means for holding said complex tool so that the complex tool is fixed or free to drive and rotate, said complex tool comprising:

a main body;

a tool means for turning provided at an outer peripheral portion of said main body, said tool means capable of machining on inner and outer peripheries of a rotating workpiece without rotating itself;

an insert installed on said tool means for turning;

a top end of said insert located to contact a workpiece by projecting a predetermined quantity outside said outer peripheral face of said main body, and projecting a predetermined quantity from a top end portion of said main body in a direction of an axial center of said tool;

a cylinder formed on said main body;

a slidable holder provided at said cylinder, being free to move in an axial center direction of said main body between a retreated position and a machining position;

an operating oil supply portion connected with said cylinder, being free to supply said slidable holder side with driving fluid supplied from said tool holding means side;

a projected rotating tool means, installed on said slidable holder, for machining on a workpiece by rotating itself provided so as to correspond to an axial center of said projected rotating tool means with an axial center of said main body, said complex tool adapted to perform turning machining on a workpiece with said tool means for turning with said main body being fixed with respect to said tool holding means and performing rotating machining on a workpiece with said projected rotating tool means by rotating said main body with respect to said tool holding means in such a state that said slidable holder is positioned at said machining position.

2. The complex tool as set forth in claim 1 wherein said projected rotating tool means is a drill, a tap, a milling cutter or an end mill.

* * * * *